United States Patent
Pao et al.

(10) Patent No.: US 8,396,947 B2
(45) Date of Patent: *Mar. 12, 2013

(54) ACTIVE MONITORING SYSTEM FOR SERIAL MONITORING DEVICE AND METHOD THEREOF

(75) Inventors: Yi Ming Pao, Taipei County (TW); Kuan Wei Cheng, Taipei County (TW); Chang Fu Hsieh, Taipei County (TW)

(73) Assignee: MOXA Inc., New Taipei (TW)

( * ) Notice: Subject to any disclaimer, the term of this patent is extended or adjusted under 35 U.S.C. 154(b) by 164 days.

This patent is subject to a terminal disclaimer.

(21) Appl. No.: 12/973,579

(22) Filed: Dec. 20, 2010

(65) Prior Publication Data
US 2012/0158927 A1    Jun. 21, 2012

(51) Int. Cl.
*G06F 15/173* (2006.01)
*G08C 17/00* (2006.01)

(52) U.S. Cl. ............ 709/220; 709/224; 340/870.07

(58) Field of Classification Search ............ 709/220, 709/224, 227, 228; 340/870.07
See application file for complete search history.

(56) References Cited

U.S. PATENT DOCUMENTS

| | | | | |
|---|---|---|---|---|
| 6,938,258 | B1 * | 8/2005 | Weinberger et al. | 719/312 |
| 7,028,304 | B1 * | 4/2006 | Weinberger et al. | 719/310 |
| 8,146,075 | B2 * | 3/2012 | Mahajan | 717/170 |
| 2003/0174070 | A1 * | 9/2003 | Garrod et al. | 340/870.07 |
| 2010/0161703 | A1 * | 6/2010 | Huang et al. | 709/201 |
| 2011/0202905 | A1 * | 8/2011 | Mahajan | 717/140 |
| 2011/0209133 | A1 * | 8/2011 | Mahajan et al. | 717/170 |
| 2012/0017205 | A1 * | 1/2012 | Mahajan | 717/170 |
| 2012/0017207 | A1 * | 1/2012 | Mahajan et al. | 717/173 |

* cited by examiner

*Primary Examiner* — Khanh Dinh
(74) *Attorney, Agent, or Firm* — Chih Feng Yeh; Huntington IP Consulting Co., Ltd.

(57) ABSTRACT

An active monitoring system for serial monitoring devices and the method thereof are provided. By receiving serial data from a serial monitoring device on a triggering device and analyzing the serial data to generate a device tag, the mechanism transmits the packed device tag actively to a server through a network. The server automatically generates a tag compliant with the Object Linking and Embedding for Process Control (OPC) according to the device tag for monitoring. The mechanism improves the compatibility and efficiency of monitoring and bandwidth usage.

12 Claims, 4 Drawing Sheets

ACTIVE MONITORING SYSTEM FOR SERIAL MONITORING DEVICE AND METHOD THEREOF

BACKGROUND OF THE INVENTION

1. Field of Invention

The invention relates to an active monitoring system for serial monitoring devices and the method thereof. In particular, the invention relates to an active serial monitoring system whose monitoring device and triggering device are connected so that the triggering device automatically transmits a device tag. The invention also relates to the method for the same.

2. Related Art

In recent years, the rapid developments in semiconductor-related industry and networking technology have enabled wider and more mature applications of monitoring systems. For example, an operator can monitor a remote serial device (e.g., a serial monitoring device) via the Internet, without being directly in front of the serial device. This does not only save manpower, but also effectively reduce the costs.

However, when the above-mentioned monitoring system needs to increase the serial devices to be monitored, one may encounter the problem of compatibility. This is because the added serial devices may come from different hardware vendors. Each of the serial devices has its devoted monitoring software and uses a different serial communications protocol, such as Modbus RTU, Canbus, DeviceNet, Interbus, etc. It is therefore an important issue for the data exchange interfaces of these devices to be compatible with each other.

In view of this, hardware vendors and software vendors publicly propose the Object Linking and Embedding for Process Control (OPC) so that different monitoring software can connect and exchange data with devices made by different hardware vendors. Nevertheless, this method cannot be compatible with serial monitoring devices that do not have OPC. Since the OPC detection method is done by polling, the method cannot effectively perform real-time monitoring. Moreover, an intrinsic constraint of polling is the problem of extra bandwidth occupation.

In summary, the prior art long has the problem of compatibility with non-OPC serial monitoring devices, real-time monitoring, and bandwidth usage. It is thus imperative to provide an improved technique to solve them.

SUMMARY OF THE INVENTION

In view of the foregoing, the invention discloses an active monitoring system for serial monitoring devices and the method for the same.

The disclosed active monitoring system for serial monitoring devices is used in a transmission environment with serial monitoring devices. It includes a server device and a triggering device. The server device further includes: an initializing module, a message processing module, and a tagging module. The initializing module loads a configuration list in the beginning, and extracts and records the statuses of serial monitoring devices according to the configuration list. The message processing module receives a message packet, and updates the configuration list according to the message packet. The tagging module generates and transmits a corresponding OPC tag according to the updated configuration list for monitoring.

The triggering device connects to the serial monitoring devices via serial ports. The triggering device includes: a storing module, an analyzing module, a converting module, a monitoring module, and a triggering module. The storing module stores a control command in advance. The analyzing module analyzes at least one serial data received by each of the serial ports in order to obtain at least one corresponding data body. The converting module uses the at least one data body to generate at least one corresponding device tag according to the OPC standard. The monitoring module continuously reads the at least one device tag and executes control command, and sets the at least one device tag according to the execution results of the control command. The triggering module packs the at least one device tag after setting into a message packet, and actively transmits the message packet to the server device.

The disclosed active monitoring method is used in a transmission environment with a server device, a triggering device, and serial monitoring devices. The method involves the steps of: storing a control command in advance on the triggering device, and connecting the triggering device with a plurality of serial monitoring devices via serial ports; loading a configuration list to the server device during initialization, and extracting and recording the statuses of the serial monitoring devices according to the configuration list; analyzing at least one serial data received by the triggering device from the serial ports in order to obtain at least one corresponding data body; using the at least one data body to generate at least one corresponding device tag according to the OPC standard on the triggering device; continuously reading the at least one device tag and executing the control command on the triggering device, and setting the at least one device tag according to the execution results of the control command; packing the at least one device tag after setting into a message packet on the triggering device, and actively sending the message packet to the server device; receiving the message packet on the server device, and updating the configuration list according to the message packet; and generating and transmitting a corresponding OPC tag according to the updated configuration list on the server device for monitoring.

The disclosed system and method described above differ from the prior art in that the invention uses the triggering device to receive the at least one serial data transmitted from serial monitoring devices, and analyzes the at least one serial data to generate at least one corresponding device tag. The at least one device tag is packed and actively sent to the server device via a network. The server device then automatically generates a corresponding OPC tag for monitoring.

Using the disclosed technique, the invention can improve the monitoring compatibility and efficiency and bandwidth usage.

BRIEF DESCRIPTION OF THE DRAWINGS

The invention will become more fully understood from the detailed description given herein below illustration only, and thus is not limitative of the present invention, and wherein.

DETAILED DESCRIPTION OF THE INVENTION

The present invention will be apparent from the following detailed description, which proceeds with reference to the accompanying drawings, wherein the same references relate to the same elements.

Before explaining in details the disclosed active monitoring system and method for serial monitoring devices, we first define the structure and terms of the invention herein. As far as the structure is concerned, the disclosed system includes a server device and a triggering device. The server device is compliant with the Object Linking and Embedding for Process Control (OPC) standard, i.e., an OPC server. It is connected with the triggering device via a network. The OPC server can receive message packets actively sent from the triggering device, and generate corresponding OPC tag compliant with the OPC standard for processing data exchanges. The triggering device connects to the serial monitoring devices via serial ports (or serial interfaces, such as RS232, RS422, RS485, etc), and receives data from the serial monitoring devices in serial transmissions (serial data in general). The serial monitoring devices include conventional serial data collecting devices, such as programmable logic controller (PLC), electronic controller, I/O device, serial sensor, etc. They are not further addressed herein. Besides, the network referred herein can be wired or wireless Internet or local area network (LAN).

The control command referred herein can consist of such commands as IF, THEN, and ELSE that are stored on the triggering device in advance. Take a complete control command as an example. Suppose the control command is 'IF (DI-1 ON) THTN (Send Active Message) ELSE (Send E-mail)'. It means that when the condition '(DI-1 ON)' holds, the invention executes the command '(Send Active Message)'. Otherwise, the command '(Send E-mail)' is executed. The condition '(DI-1 ON)' can be determined according to the data body recorded in the device tag. For example, the data body '0x01, 0x01' means that the input port (DI-1) is open. So the condition holds. The command '(Send Active Message)' means to send a message. The command '(Send E-mail)' means to send E-mail. The commands referred herein are computer executable commands.

Figure 1:
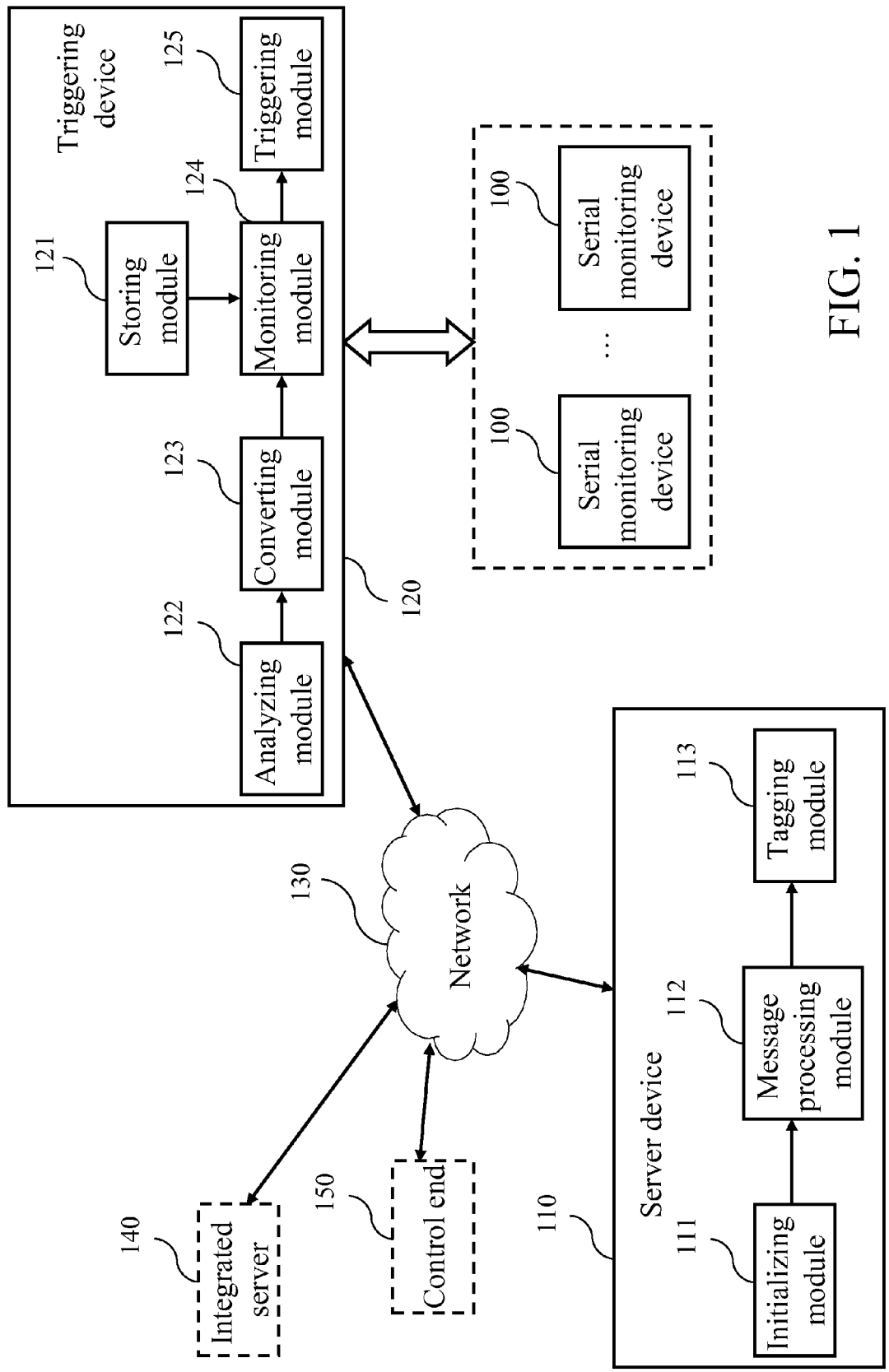
FIG. 1 is a block diagram of the disclosed active monitoring system for serial monitoring devices.

Please refer to FIG. 1 for a block diagram of the disclosed active monitoring system for serial monitoring devices. The system includes: serial monitoring devices 100, a server device 110, and a triggering device 120. The serial monitoring devices 100 and the triggering device 120 are connected via serial ports (e.g., RS232). The server device 110 and the triggering device 120 are connected via a network 130. The system can further include at least one of an integrated server 140 and a controlling device 150. It should be noted that the serial monitoring devices 100 are serial data collecting devices for collecting serial data detected or entered at a sensor, monitoring device, or measuring device. Different serial monitoring devices 100 may use a distinct, devoted or IEEE standard communications protocol, e.g., Modbus RTU, Canbus, DeviceNet, Interbus, etc. For example, suppose a sensor (not shown) uses the communications protocol 'Modbus RTU'. Then the serial monitoring device connected with the sensor must use the same communications protocol 'Modbus RTU' in order to collect the serial data produced by the sensor.

The server device 110 includes: an initializing module 111, a message processing module 112, and a tagging module 113. The initializing module 111 loads a configuration list during initialization, and extracts and records the statuses of the serial monitoring devices 100 according to the configuration list. The configuration list records device tag generated by the triggering device 120. Each device tag includes at least a tag amount, an identification (ID) code, a tag existing time, tag contents, tag transmission quality, latest update time, and the error code when an error occurs in a data exchange of each serial monitoring device.

The message processing module 112 receives a message packet generated by and actively transmitted from the triggering device 120 via the TCP/IP protocol. Moreover, the message processing module 112 updates the configuration list according to the received message packet. The update is done according to the elements recorded in the device tag in the message packet. It should be mentioned that in practice the device tag may further include the structure of transmitted strings. Alternatively, the server device 110 by default has a correspondence relation between the ID code and device-related information. Therefore, the server device 110 can use the string contained in the device tag or compare the ID code to know information about the serial data collecting device, including the device name, type, purpose, etc.

The tagging module 113 generates and transmits a corresponding OPC tag according to the updated configuration list for monitoring. For example, the OPC tag is transmitted to a monitoring display device (not shown) for display or to the integrated server 140 for further processing. The generated OPC tag has to comply with the OPC standard. Since this industrial communications standard belongs to the prior art, it is not further detailed herein. The task performed by the integrated server 140 will be explained later.

The triggering device 120 is connected with the serial monitoring devices 100 via serial ports. The triggering device 120 includes: a storing module 121, an analyzing module 122, a converting module 123, a monitoring module 124, and a triggering module 125. It may even be equipped with a timer for timing. The storing module 121 stores a control command in advance. In practice, a control command can be input and transmitted via the control end 150 on the network 130. The control command is stored in the storing module 121. The control end 150 will be detailed later.

The analyzing module 122 analyzes the serial data received by each of the serial ports in order to obtain the corresponding data body. The data body generally refers to sensed analog or digital data. In practice, the analyzing module 122 is built in with various different serial transmission protocol standards, and can analyze packets of different serial transmission protocols (e.g., serial data) accordingly. For example, suppose the serial transmission protocol used by the serial monitoring device 100 is Modbus RTU. Then the analyzing module 122 can determine that the used serial transmission protocol as Modbus RTU according to the header of the serial data, and extract the data body contained therein.

The converting module 123 uses the data body to generate a corresponding device tag according to the OPC standard. In practice, the device tag includes tag amount (e.g., the number of I/O channels when the serial monitoring device 100 is a remote I/O), ID code (for identifying the tag contents), tag existing time (how long a particular tag has not been updated), tag contents, tag transmission quality (e.g., 'GOOD' or 'BAD'), latest update time, and the error code whenever an error occurs during a data exchange of a serial monitoring device 100. Suppose the analyzing module 122 extracts the data body as '0x01'. Then the converting module 123 generates a device tag according to the OPC standard. The tag content is '0x01'. The other elements of the device tag can be set according to the parameters for the handshaking of serial communications protocol in practice or by computing the existing time of the device tag.

The monitoring module 124 continuously reads the device tag and executes the control command pre-stored in the storing module 121, and sets the device tag according to the execution result of the control command. For example, suppose during the process of continuously reading the device tag and executing the control command, the tag content is found to change from '0x01' to '0x00'. Then an event happens. Afterwards, the device tag is set according to the execution result of the control command. For example, a warning message or notification message is embedded in the tag contents. In practice, the execution result of the control command generates a trigging signal to control the serial monitoring device 100. Since this belongs to the prior art, it is not further described herein.

The triggering module 125 packs the device tag after setting to generate a message packet. After the message packet is generated, it is actively transmitted to the server device 110. The network packet packaging belongs to the prior art; and it is not further described herein.

Besides, the disclosed system can further includes the integrated server 140 for receiving the OPC tag transmitted from the server device 110 for data exchange processing and/or graphics control processing. For example, the user can control a remote device via a graphics interface. Moreover, the disclosed system can further include a control end 150 for transmitting a control command to the triggering device 120 after it is entered and saving the control command in the storing module 121. Before the transmission, the control end 150 further encodes the control command into byte code. In practice, the integrated server 140 and the control end 150 can be computer devices that have the networking function, such as personal computers (PC's), personal digital assistants (PDA's), etc.

Figure 2:
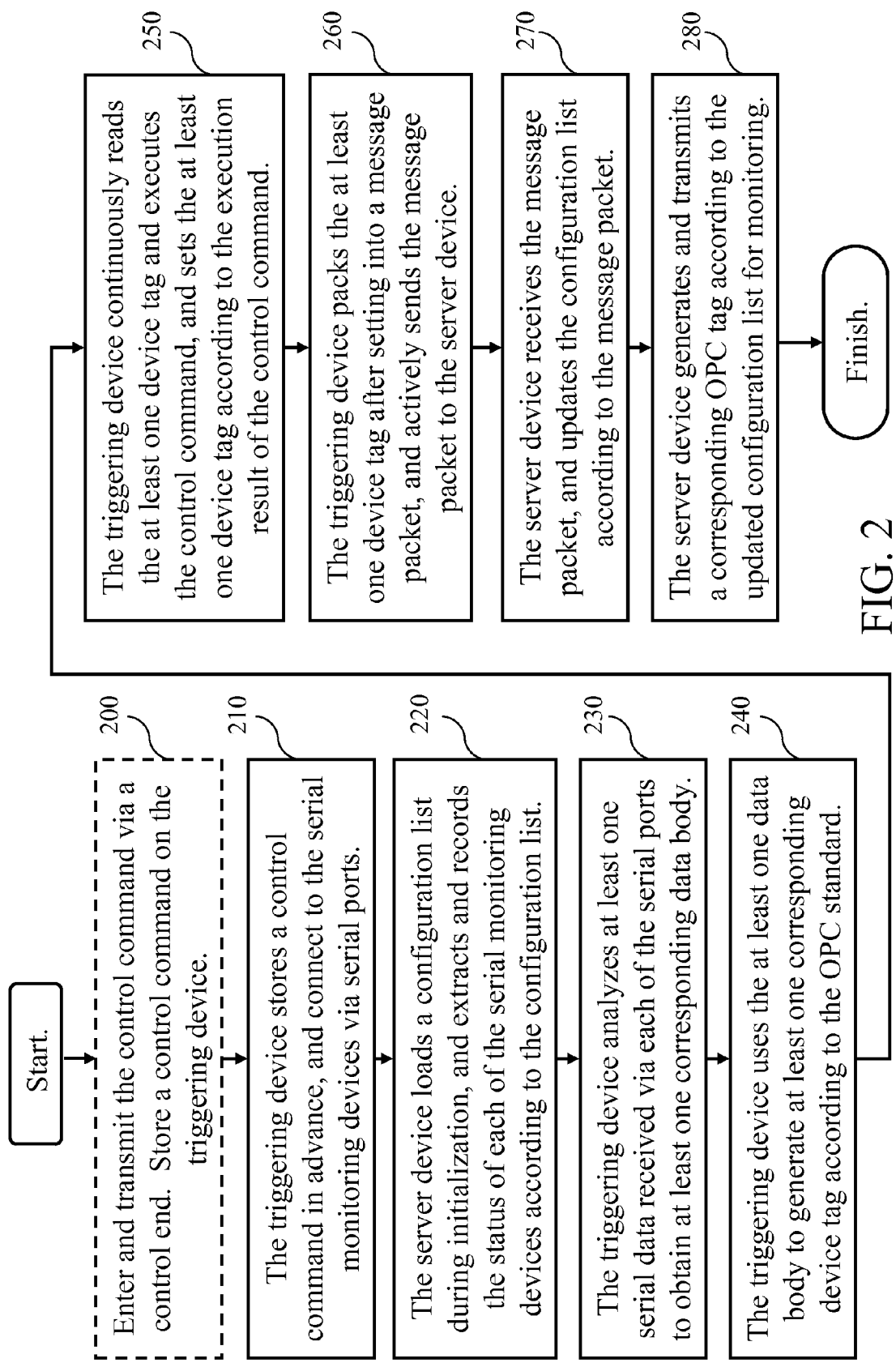
FIG. 2 is a flowchart of the active monitoring method according to the invention.

FIG. 2 is a flowchart of the disclosed active monitoring method for serial monitoring devices, applied to a transmission environment with a server device 110, a triggering device 120, and serial monitoring devices 100. The method includes the steps of: storing a control command in advance on the triggering device 120, and connecting the triggering device with a plurality of serial monitoring devices 100 via serial ports (step 210); loading a configuration list to the server device 110 during initialization, and extracting and recording the statuses of the serial monitoring devices 100 according to the configuration list (step 220); analyzing at least one serial data received by the triggering device 120 from the serial ports in order to obtain the at least one corresponding data body (step 230); using the at least one data body to generate the at least one corresponding device tag according to the OPC standard on the triggering device 120 (step 240); continuously reading the at least one device tag and executing the control command on the triggering device 120, and setting the at least one device tag according to the execution results of the control command (step 250); packing the at least one device tag after setting into a message packet on the triggering device 120, and actively sending the message packet to the server device 110 (step 260); receiving the message packet on the server device 110, and updating the configuration list according to the message packet (step 270); and generating and transmitting a corresponding OPC tag according to the updated configuration list on the server device 110 for monitoring (step 280). Through the above-mentioned steps, the triggering device 120 receives the serial data transmitted from the serial monitoring devices 100, and analyzes the serial data to generate at least one device tag. The at least one device tag is packed and actively sent via the network to the server device 110. The server device 110 automatically generates corresponding OPC tag for monitoring. This improves the monitoring compatibility and efficiency and bandwidth usage. In practice, the user can enter and transmit a control command via the control end 150 before step 210, and store the control command on the triggering device 120 (step 200).

Figure 3:
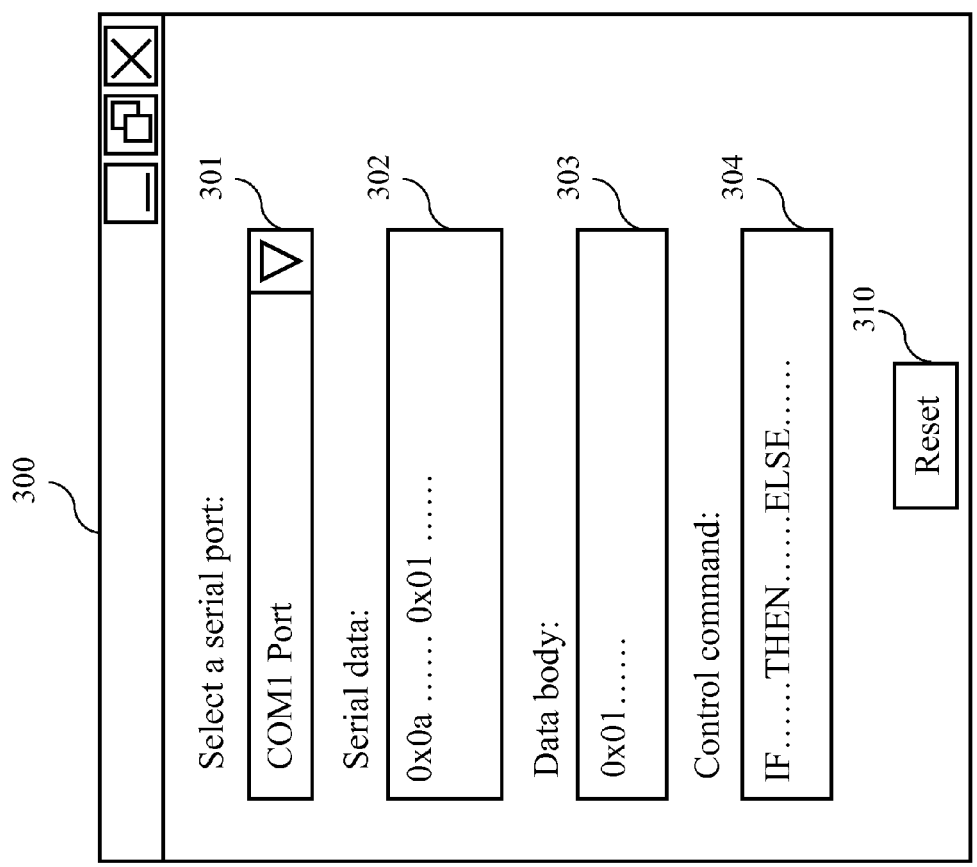
FIG. 3 is a schematic view of setting the triggering device according to the invention.

In the following, an embodiment is used to explain the invention, with reference to FIGS. 3 and 4. Please first refer to FIG. 3, which is a schematic view of setting the triggering device according to the invention. The drawing shows a setting window 300 that includes a serial port selecting element 301, a serial data browsing area 302, a data body browsing area 303, a control command setting area 304, and a reset element 310. It should be mentioned that the invention does not put any restriction on the type and number of elements contained in the setting window 300.

First, when a user wants to use the disclosed active monitoring system for serial monitoring devices, the serial monitoring devices 100 and the network 130 have to maintain normal operations in addition to the server device 110 and the triggering device 120. The triggering device 120 also has to have stored a control command. The triggering device 120 and the serial monitoring devices are connected via serial ports.

When the server device 110 starts, the initializing module 111 thereof loads a configuration list that records information related to the triggering device 120 (i.e., device tag information). Therefore, the server device 110 extracts and records the statuses of all the serial monitoring devices 100 by polling the triggering device 120 according to the configuration list. The message processing module 112 waits to receive the message packets generated by and actively transmitted from the triggering device 120 following the TCP/IP protocol. In practice, the server device 110 can open a listen port to wait and receive the message packet transmitted from the triggering device 120. It should be noted that when there is no information related to the triggering device 120 in the configuration list, one can directly open the listen port to wait and receive the message packet transmitted from the triggering device 120. In practice, the configuration list can exist as a file, such as 'OPC.mdb'.

When the triggering device 120 starts or restarts, it continuously receives serial data from the serial monitoring devices 100 via the serial ports. The serial data are analyzed by the analyzing module 122 to obtain the corresponding data bodies. The analyzing module 122 recognizes various serial communications protocols, e.g., Modbus RTU, Canbus, DeviceNet, Interbus, Profibus, Modbus, Hart, As-interface, CAN, Foundation Fieldbus, LonWorks, and so on. Since recognizing serial communications protocols belongs to the prior art, it is not further described herein. After recognizing the serial communications protocol used in the serial data, the analyzing module 122 extracts data other than the header thereof as the data body. In practice, to browse serial data received by the triggering device 120 and the data body analyzed therefrom, the user can connect to the triggering device directly via the serial port or the control end of the network 130. It is achieved using the setting window 300, as shown in FIG. 3, after the connection is established. After the user selects a serial port to browse using the serial port selecting element 301, the serial data browsing area 302 displays all the serial data received via the selected serial port. The data body browsing area 303 displays the corresponding data body. It should be emphasized that the invention does not restrict the serial data and the displaying method of the data body.

In addition, the user can edit the control command in the control command setting area 304, and stores the edited control command to the storing module 121 of the triggering device 120. Since the control command has been explained before, it is not repeated here again. Besides, the user can click the reset element 310 to reset the triggering device 120 (i.e., restart). It should be noted that the triggering device 120 can continuously execute the control command in order to continuously generate at least one device tag at a fixed time interval. The time interval can be set while the user edit the control command in the control command setting area 304. For example, editing the control command as 'IF (timeout 1000) THTN (Send device tag) ELSE (null)' means that the device tag is transmitted every 1000 mille-second (i.e., one second). Afterwards, the triggering device 120 continuously executes the control command. At the fixed time interval (e.g., one second), the data body is used to generate a device tag compliant with the OPC standard. The subsequent processing of the device tag is the same as that described before. Therefore, it is not further described herein.

Figure 4:
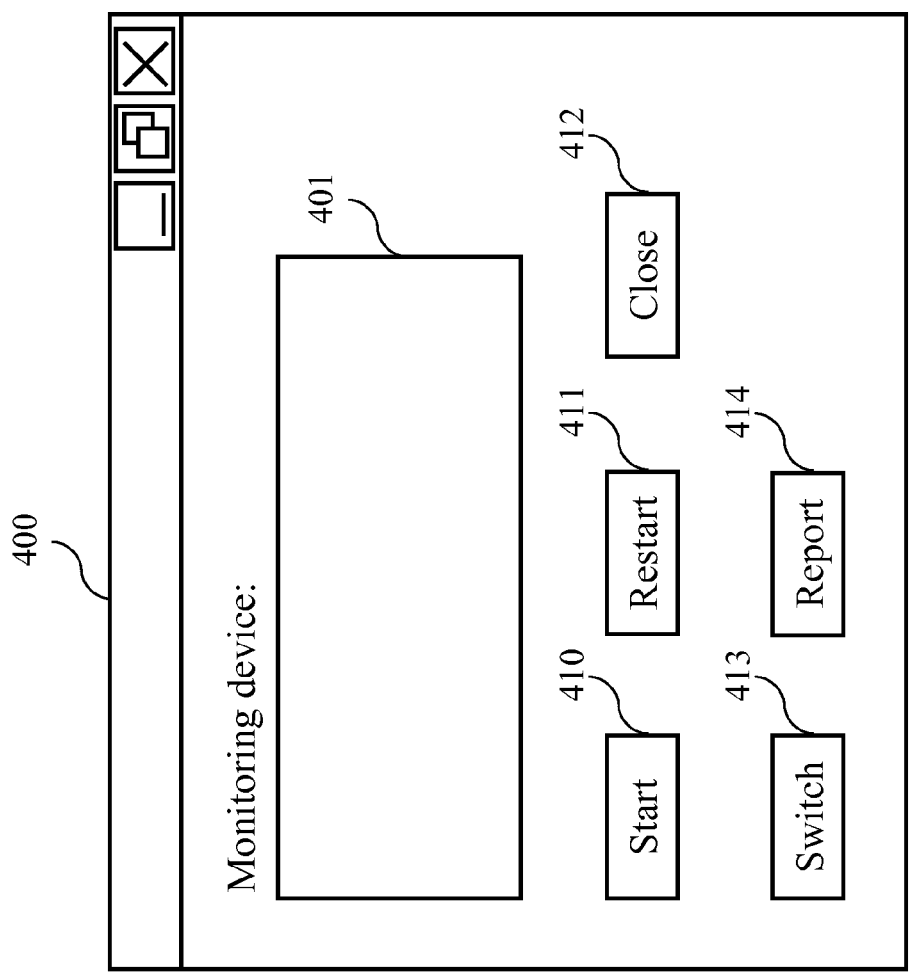
FIG. 4 is a schematic view graphics monitoring according to the invention.

FIG. 4 is a schematic view showing the graphics monitoring using the invention. As mentioned before, the disclosed active monitoring system for serial monitoring devices further includes an integrated server 140. After the server device 110 generates a corresponding OPC tag compliant with the public industrial communication standard, the integrated server 140 can use the OPC tag to perform the corresponding data exchanges, e.g., graphics monitoring. In practice, the integrated server 140 runs software that has Supervisor Control And Data Acquisition (SCADA). It can perform graphics monitoring via a graphics control window 400. For example, the message in the OPC tag is analyzed. The analysis result is shown in a device displaying area 401. A switching element 413 may even be used to switch among different serial monitoring devices 100. A starting element 410, a restarting element 411 and a closing element 412 are used to start, restart, and close remote monitoring on the selected serial monitoring device 100, respectively. Besides, one can also click a reporting element 414 to generate a report containing at least one of text, plot, and table according to the OPC tag.

In summary, the invention differs from the prior art in that the invention uses the triggering device 120 to receive the serial data transmitted from serial monitoring devices 100, and analyzes the serial data to generate at least one device tag. The at least one device tag is packed and actively sent to the server device 110 via a network 130. The server device 110 then automatically generates corresponding OPC tag for monitoring. This technique actively sends the statuses of the serial monitoring devices 100 to the server device 110. Using the disclosed technique, the invention can improve the monitoring compatibility and efficiency and bandwidth usage.

Although the invention has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the invention.

What is claimed is:

1. An active monitoring system for serial monitoring devices used in a transmission environment having a plurality of serial monitoring devices, the system comprising:
a server device, including:
an initializing module for loading a configuration list during initialization and extracting and recording the status of each of the serial monitoring devices according to the configuration list;
a message processing module for receiving a message packet and updating the configuration list according to the message packet; and
a tagging module for generating and transmitting a corresponding OPC tag according to the updated configuration list for monitoring; and
a triggering device in connection with each of the serial monitoring devices via a serial port, the triggering device include:
a storing module for storing a control command in advance;
an analyzing module for analyzing at least one serial data received via each of the serial ports to obtain at least one corresponding data body;
a converting module for using the at least one data body to generate at least one corresponding device tag according to the OPC standard;
a monitoring module for continuously reading the at least one device tag and executing the control command and setting the at least one device tag according to the execution result of the control command; and
a triggering module for packing the at least one device tag after setting into the message packet and actively sending the message packet to the server device.

2. The active monitoring system for serial monitoring devices of claim 1 further comprising a control end for entering and transmitting the control command and storing the control command in the storing module.

3. The active monitoring system for serial monitoring devices of claim 2, wherein the control end further encodes the control command into a byte code.

4. The active monitoring system for serial monitoring devices of claim 1 further comprising an integrated server for receiving the OPC tag transmitted from the server device for data exchange processing and/or graphics control processing.

5. The active monitoring system for serial monitoring devices of claim 1, wherein the configuration list records at least one device tag generated by the triggering device.

6. The active monitoring system for serial monitoring devices of claim 5, wherein each device tag includes a tag amount for exchanges with the serial monitoring devices, ID code, tag existing time, tag contents, tag transmission quality, latest update time, and error code whenever an error occurs during each data exchange.

7. An active monitoring method for serial monitoring devices used in a transmission environment having a server device, a triggering device, and a plurality of serial monitoring devices, the method comprising the steps of:
storing a control command in advance on the triggering device, and connecting the triggering device with a plurality of serial monitoring devices via serial ports;
loading a configuration list to the server device during initialization, and extracting and recording the statuses of the serial monitoring devices according to the configuration list;
analyzing at least one serial data received by the triggering device from the serial ports in order to obtain at least one corresponding data body;
using the at least one data body to generate at least one corresponding device tag according to the OPC standard on the triggering device;
continuously reading the at least one device tag and executing the control command on the triggering device, and setting the at least one device tag according to the execution results of the control command;
packing the at least one device tag after setting into a message packet on the triggering device, and actively sending the message packet to the server device;
receiving the message packet on the server device, and updating the configuration list according to the message packet; and
generating and transmitting a corresponding OPC tag according to the updated configuration list on the server device for monitoring.

8. The active monitoring method for serial monitoring devices of claim 7 further comprising the step of storing the control command on the triggering device after entering and transmitting the control command via a control end.

9. The active monitoring method for serial monitoring devices of claim 8, wherein the control command is encoded into a byte code by the control end.

10. The active monitoring method for serial monitoring devices of claim 7, wherein the step of generating and transmitting the corresponding OPC tag for monitoring further uses an integrated server to receive the OPC tag transmitted from the server device for data exchange processing and/or graphics control processing.

11. The active monitoring method for serial monitoring devices of claim 7, wherein the configuration list records at least one device tag generated by the triggering device.

12. The active monitoring method for serial monitoring devices of claim 11, wherein each device tag includes a tag amount for exchanges with the serial monitoring devices, ID code, tag existing time, tag contents, tag transmission quality, latest update time, and error code whenever an error occurs during each data exchange.

* * * * *